United States Patent [19]
Leatherman

[11] 3,996,090
[45] Dec. 7, 1976

[54] METHOD OF MAKING CONTAINER ARTICLE HAVING HEATABLE STRATIFIED MATERIAL PORTION

[75] Inventor: Alfred F. Leatherman, Columbus, Ohio

[73] Assignee: William C. Heller, Jr., Milwaukee, Wis.

[22] Filed: Mar. 7, 1974

[21] Appl. No.: 448,985

Related U.S. Application Data

[62] Division of Ser. No. 215,855, Jan. 6, 1972, Pat. No. 3,802,985.

[52] U.S. Cl. .............................. 156/244; 156/272; 264/209; 264/211
[51] Int. Cl.² ..................... B29C 27/04; B29F 3/02
[58] Field of Search ............ 156/69, 272, 244, 273, 156/242; 264/211, 177 R, 209

[56] References Cited
UNITED STATES PATENTS

| | | |
|---|---|---|
| 2,632,205 | 3/1953 | Harris .............................. 156/244 |
| 3,367,808 | 2/1968 | Edwards ........................... 156/272 |
| 3,528,867 | 9/1970 | Leatherman et al. ............. 156/272 |
| 3,548,140 | 12/1970 | O'Neill ................................. 156/69 |
| 3,549,440 | 12/1970 | Adock et al. ......................... 156/69 |
| 3,697,368 | 10/1972 | Bhuta et al. ...................... 156/244 |
| 3,700,513 | 10/1972 | Haberhauer et al. ................ 156/69 |
| 3,723,212 | 3/1973 | Casper ................................. 156/69 |
| 3,730,804 | 5/1973 | Dickey .............................. 156/272 |
| 3,767,076 | 10/1973 | Kennedy ............................. 156/69 |

*Primary Examiner*—Charles E. Van Horn
*Assistant Examiner*—M. G. Wityshyn
*Attorney, Agent, or Firm*—Andrus, Sceales, Starke & Sawall

[57] ABSTRACT

A container article is formed from a stratified material having an inductively heatable layer. A first article part has a thermally joinable region. A second stratified article part, formed by coextrusion, has a layer containing an oxide susceptor. The container parts are assembled and subjected to an alternating magnetic field to heat the susceptor and thermally join the parts.

12 Claims, 10 Drawing Figures

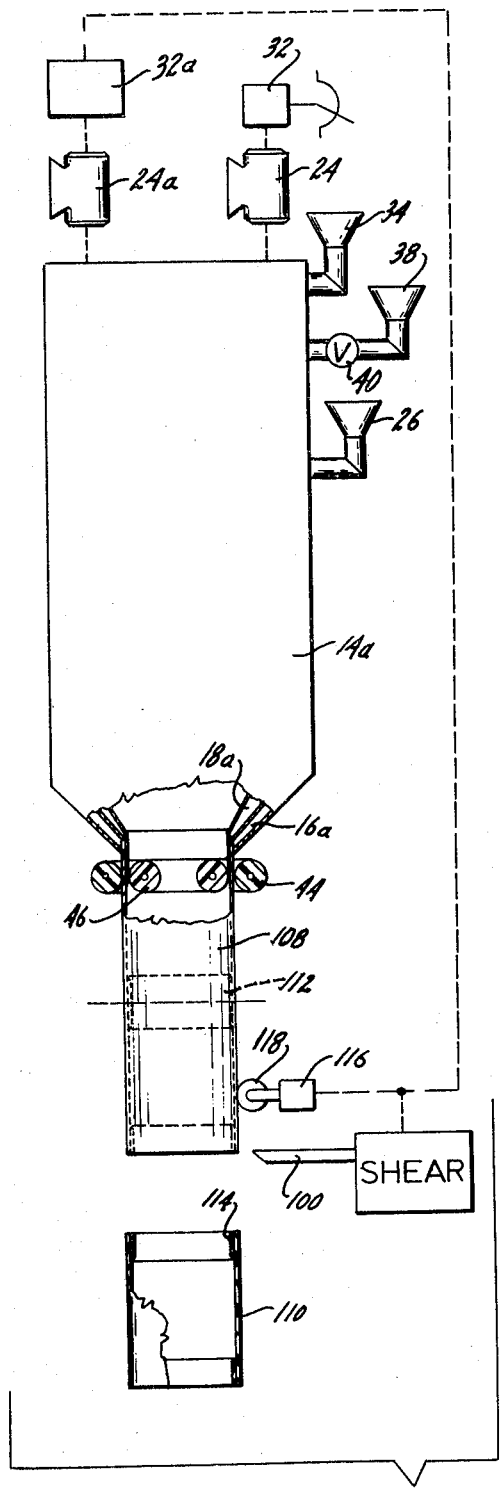
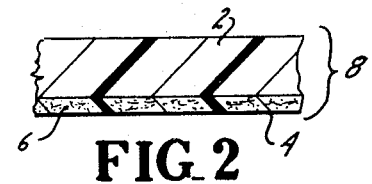
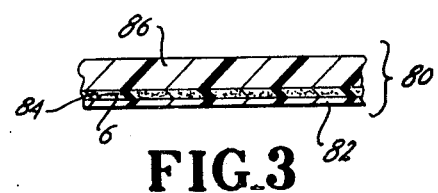
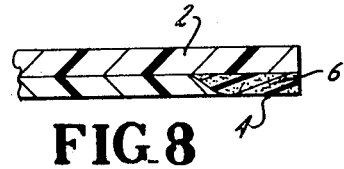
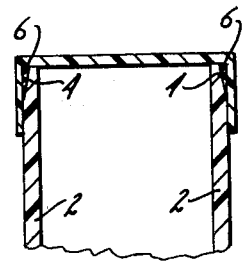

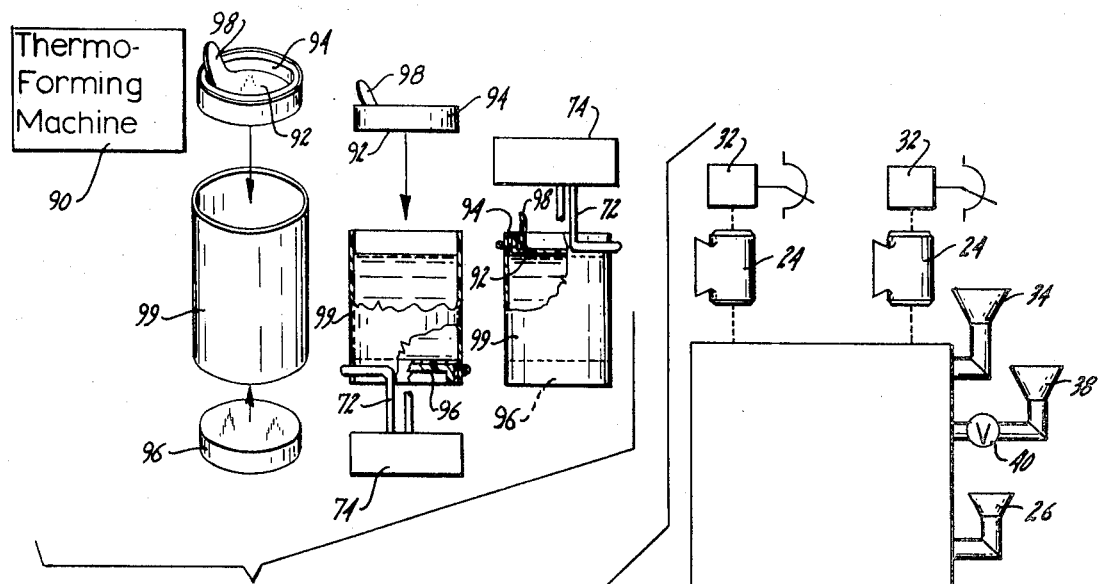
FIG.4
FIG.5
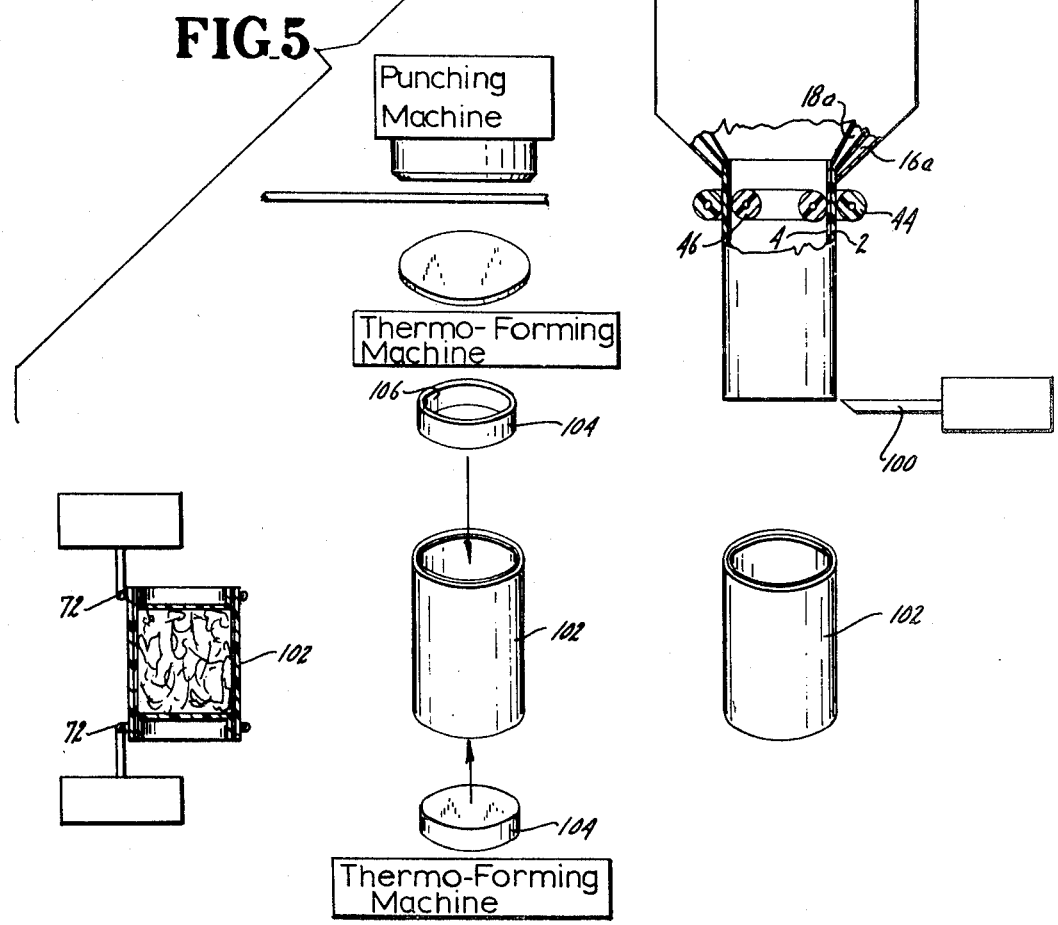

METHOD OF MAKING CONTAINER ARTICLE HAVING HEATABLE STRATIFIED MATERIAL PORTION

CROSS REFERENCE TO RELATED APPLICATION

This patent application is a divisional application of U.S. patent application Ser. No. 215,855 filed Jan. 6, 1972, now U.S. Pat. 3,802,985 issued April 9, 1974.

BACKGROUND OF THE INVENTION

1. Field of the Invention

The present invention relates to container articles formed of stratified or layered plastic material and to a method of making same.

2. Description of the Prior Art

The common tin can container, while possessing several advantages, including relatively low cost, non-breakability, high heat resistance, etc., has many disadvantages, such as contamination of the contents of the can in the event the integrity of the can or varnish coating on the steel material is lost, difficulty in opening, etc. However, the provision of a feasible substitute for the ordinary tin can has proven elusive to date. While efforts have been made to provide a comparable plastic container, the unavailability of a plastic substance having all the properties necessary for the material for such a container has prevented realization of a satisfactory substitute.

Another problem is that of joinder of the parts of a plastic container. The use of adhesives is undesirable because of possible contamination of the contents of the container. Low cost plastic container materials, such as polyethylene, cannot be easily joined by readily available adhesives. Heat-seal bonds, formed by heated bars, and the like, have left much to be desired in terms of processing speed and the integrity of the bond and its strength.

The gist of the present invention is to employ, in the manufacture of container articles, a stratified material which advantageously combines the desirable properties of several different types of plastics. For example, the various layers of the stratified material may present a barrier to gas and/or moisture transmission or give strength, bulk, grease and scuff resistance, or heat resistance to the material.

Another feature of the present invention is to obviate the joinder problems heretofore encountered in the manufacture of plastic containers by providing a heat generating layer in the the stratified material. This may typically be accomplished by dispersing in one of the layers a particulate material susceptible to heating by an alternating magnetic field through hysteresis losses. The advantages of the technique of the present invention includes, among others, concentration of the heat at or near the bonding interface, close control of bonding temperature, and ease of handling since no adhesive or other bonding accessories are required.

Since many of the susceptible particulate materials, hereinafter termed susceptors, possess undesirable colorations, the coloration caused by incorporation of the susceptor may be masked with an opaque layer, for example by a white layer, to hide the particle coloration.

SUMMARY OF THE PRESENT INVENTION

The present invention utilizes the technique of coextrusion to provide the aforesaid stratified material. Coextrusion is a specific aspect of the more generally plastic forming technique termed extrusion. To form plastic by extrusion the plastic material is placed in a malleable state, as by application of heat thereto, and forced through a die under pressure. In coextrusion, two or more plastic materials are placed in a fusible state and extruded. Before, during, or after the plastic materials emerge from the dies, they are intimately bonded together to form a stratified material.

In the present invention, a particulate susceptor is incorporated in one of the coextruded plastic materials, thereby to provide a stratified material including a heatable layer. Coextrusion is particularly useful in the formation of such stratified materials as the heatable layer may be thicker than that which can be provided by coating or other methods. Further, the strength of the bond between coextruded strata is extremely high and far exceeds that obtainable by adhesive coating techniques. The materials comprising the layers of the stratified material, including that containing the particulate susceptor, may be selected for chemical or physical properties desired in container elements.

In many cases, the cost of providing a heatable stratified material by the method of the present invention is considerably less than that of other techniques, such as coating, and the like. This is reflected in a reduction in the cost of the plastic articles of the present invention utilizing such materials and methods.

In providing a container article, the stratified material, formed as above, is shaped into one or more parts of the container. The parts of the article, including those formed of the stratified material, are assembled and the stratified material is exposed to an alternating magnetic field at areas of contact to heat the susceptor, the stratified material, and the adjacent portions of the other article parts to thermally join the parts together to form the completed container article. Through the practice of the present invention it appears possible to provide such containers at one-third the cost of conventional tin cans.

BRIEF DESCRIPTION OF THE DRAWING

FIG. 2 is a detailed, partial, cross sectional view of one embodiment of a stratified material suitable for use in the method and container of the present invention.

FIG. 3 is a detailed, partial, cross sectional view of another embodiment of a stratified material suitable for use in the method and container of the present invention.

FIG. 4 is a partially diagrammatic illustration of the practice of another embodiment of the method of the present invention showing the container article and container.

FIG. 5 is a partially diagrammatic illustration of the practice of another embodiment of the method of the present invention and the container article of the invention.

FIG. 6 is a partial diagrammatic illustration of the practice of another embodiment of the method of the present invention and a container article portion formed thereby.

FIG. 7 is a detailed, partial, cross sectional view of the article portion shown in FIG. 6.

FIGS. 8 and 9 are detailed, partial, cross sectional views showing modifications of the stratified material shown in FIG. 7.

FIG. 10 is a partial, cross sectional view showing an article formed of the stratified material shown in FIG. 9.

DESCRIPTION OF THE PREFERRED EMBODIMENT

Figure 1:
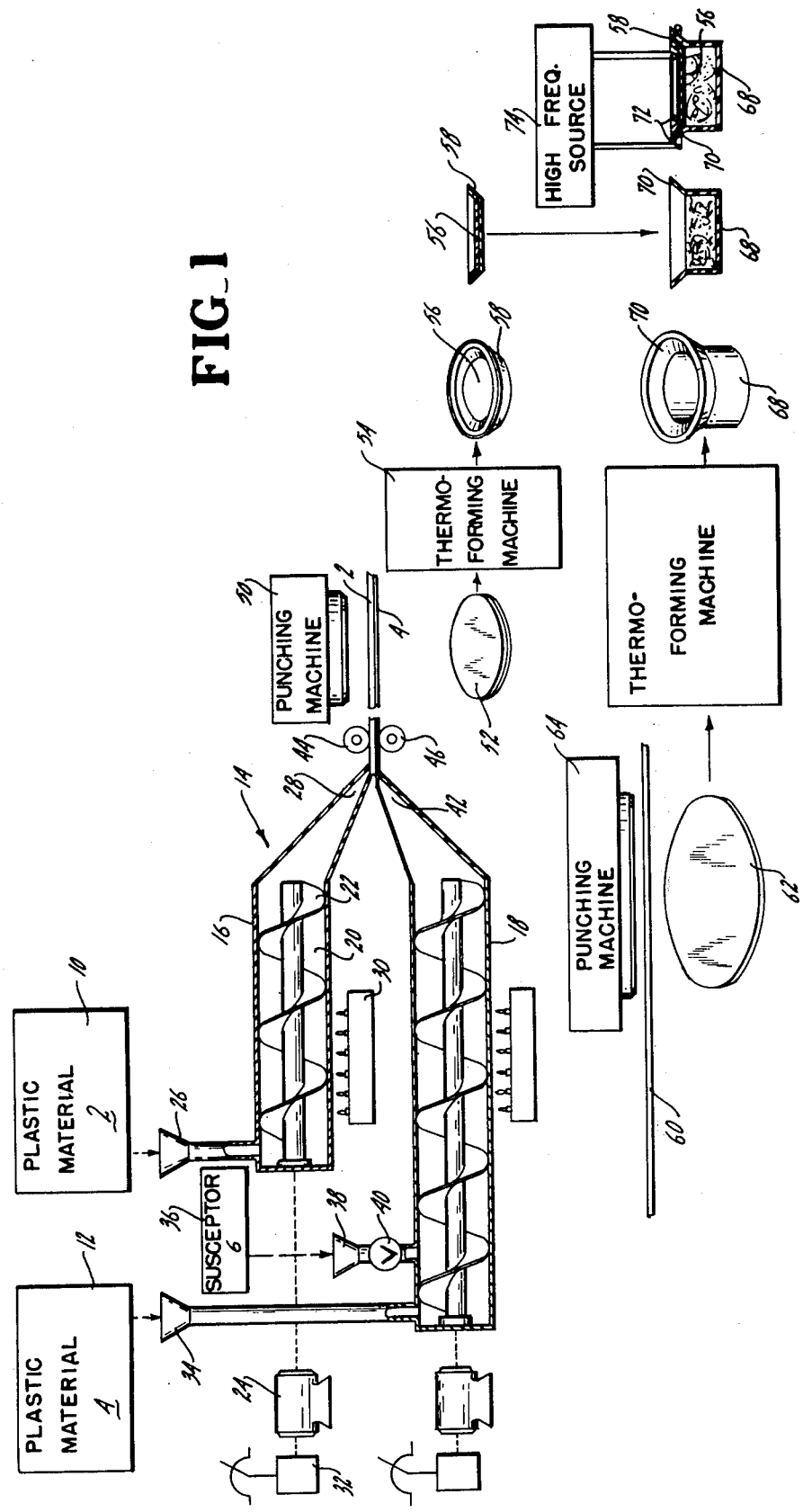
FIG. 1 is a partially diagrammatic illustration of the practice of the method of the invention showing a container article of the invention.

FIG. 1 shows the process steps in forming a closed container article having a stratified article part with a heat generating layer. Initially, the plastic materials for the various layers of the stratified article part are selected. These materials may be of the same type, for example, all polyethylene, all polypropylene, or all polystyrene, or may be different types so as to provide a composite structure incorporating the desirable properties of a plurality of plastic materials. However, since the integrity of a coextruded structure depends on the fusion-like bond obtained between the layers, it is desirable that the plastic materials forming the stratified structure be thermally fusible.

In FIG. 1, a two layer stratified material is formed, and hence two plastic compositions are employed. For purposes of explanation, it may be assumed that the coextruded stratified material consists of a 10 mil joinder layer of polyethylene containing the susceptor and a 40 mil layer, also of polyethylene, which provides structural strength to the material. The 40 mil layer may also be pigmented to mask the coloration of the 10 mil layer by the dispersion of a filler, such as titanium dioxide, in the layer. The coextrusion technique of the present invention provides a heatable polyethylene structure at considerably less cost than if the susceptor material was dispersed throughout the entire 50 mil thickness of the material. The stratified material 8 so formed is shown in FIG. 2 to include masking layer 2 and heatable layer 4 containing susceptor 6.

Another two layer structure might typically consist of a 50 mil layer of an acrylonitrile copolymer having a 10 mil layer of the acrylonitrile copolymer containing the susceptor.

Susceptor 6 comprises a particulate substance heatable by an alternating magnetic field. Susceptors comprising, at least in part, metallic oxides having ferromagnetic properties are suitable for use as susceptor 6. The oxide compounds, gamma $Fe_2O_3$ and $Fe_3O_4$ have been found to be useful susceptors. In addition to their high heat generating properties by hysteresis losses such compounds may be reduced to extremely small size. This size reduction is without loss of heat generating properties and facilitates the dispersion of susceptor 6 in layer 4. Metallic oxide susceptors may be reduced to submicron particle sizes, for example 0.01 microns. A typical maximum particle size is 20 microns. The amount of such particles utilized depends on the heating rates desired in heatable layer 4. The amount of paticulate susceptor may range from less than 1% to 30% or more by weight with respect to the plastic of layer 4.

Plastics 2 and 4 will usually be of extrusion grade and are commonly provided in pellet or flake form. Plastic material 2 is placed in hopper 10 while plastic material 4 is placed in hopper 12. Hoppers 10 and 12 supply the plastics to coextrusion machine 14.

Coextrusion machine 14 may comprise a pair of extrusion passages 16 and 18, each of which comprise a tubular passage down which a plastic material may be propelled toward an extrusion die. For example, extrusion passage 16 includes tube 20. Auger 22 rotated by motor 24 is positioned in tube 20 to receive plastic material 2 from hopper 10, via loading apparatus 26, and move the material toward extrusion die 28. In the method of FIG. 1, a coextruded flat sheet is formed. For this purpose, extrusion die 28 may comprise the end of tube 20 formed as an elongated slot. Or, a separate extrusion die may be affixed to the end of tube 20. The plastic material may be heated to the fusible state during its passage down tube 20, as by heater 30. The speed of motor 24 is regulated by control 32.

Extrusion passage 18 is similar in construction to extrusion passage 16. Plastic material 4 in hopper 12 is supplied to extrusion passage 18 by loading apparatus 34. Since plastic material 4 which is formed in passage 18 carries particulate susceptor 6, it is necessary to provide some technique for admixing the two substances. This admixture may be done prior to coextrusion is desired. For example, plastic material 4 and particulate susceptor 6 may be milled on hot rolls to provide the desired admixing action. The resulting products may be formed into a sheet, ground up, and placed in hopper 12.

It is also possible to provide the desired mixing action in extrusion passage 18. For this purpose, hopper 36 is provided for the particulate susceptor material. The particulate susceptor 6 feeds into loading apparatus 38.

In the process of the present invention, plastic material 4 passes from hopper 12 into loading apparatus 34. The particulate susceptor 6 passes from hopper 36 into loading apparatus 38. A valve 40, or other control means may be provided to regulate the amount of susceptor material provided. As auger screw 22 in extrusion passage 18 moves plastic material 4 and the susceptor material down extrusion passage 18, plastic material 4 and susceptor 6 become mixed. The heating of plastic material 4 to the fusible state by heater 30, combined with the agitation provided by auger 22 causes susceptor 6 to be incorporated in plastic material 4 as the plastic material approaches extrusion die 42 at the end of extrusion passage 18. Extrusion die 42, either as the end of extrusion passage 18 or as a separate element, may be formed as an elongated slot.

Plastic material 2 feeds from hopper 10 into loading apparatus 26. Auger screw 22 moves plastic material 2 down extrusion passage 16, where it is placed in the fusible state by heater 30. The filler material necessary to render plastic material 2 opaque may be incorporated in the plastic material prior to extrusion or it may be dispersed in plastic material 2 in extrusion passage 16 in a manner similar to that described above in connection with susceptor 6.

Extrusion die 28 and extrusion die 42 are positioned so that before, during, or after the layers of plastic material 2 and plastic material 4 emerge from the extrusion dies, they are placed in contact and fused together. The coextrusion process provides sufficient mixing of plastic material 2 and plastic material 4 to provide a high strength bond without excessive dispersion of one plastic material within the other. Pressure rolls 44 and 46 may assist in the formation of the intralayer joinder.

The result is a stratified material 8 having the plastic material 2 layer on top and the plastic material 4 layer containing particulate susceptor 6 on the bottom, as shown in FIG. 2. The thickness of the plastic material layer may be controlled by the size of dies 28 and 42, the speed at which augers 22 are rotated by motors 24, the screw configuration of augers 22, the diameters of extrusion passages 16 and 18, the temperatures of plastic materials 2 and 4, etc.

FIG. 1 shows a method for forming a container article incorporating the stratified material 8 produced as described above. In the disclosed exemplary embodiment, the stratified material 8 forms the lid of a container article. To this end, the stratified material 8 is placed under punching machine 50 which punches a disc-like container lid blank 52 therefrom. Blank 52 is heated in thermoforming machine 54 to provide lid 56 having a contiguous, upturned sealing lip 58. Plastic material 4 containing susceptor 6 forms the outer surface of sealing lip 58.

The bottom of the container article is formed from a sheet of plastic material 60. Plastic material 60 is selected to be thermally joinable to the plastic material 4. A container bottom blank 62 is provided from sheet 60 by punching machine 64. Blank 62 is passed through thermoforming machine 66 to form container bottom 68 having flange 70 designated to mate with lip 58 of lid 56.

After filling container bottom 68, lid 56 is placed on container bottom 68 with lip 58 in abutment with flange 70. An induction heating coil 72 is placed adjacent lip 58 and flange 70.

Upon the energization of induction heating coil 72 by high frequency source 74, susceptor 6 becomes heated by the alternating magnetic field, heating plastic material 4 and the abutting portions of flange 70. The frequency of the alternating magnetic field may be selected in accordance with desired heating rates, type of susceptor, etc. The frequency may typically be from 450 kilohertz to 5000 megahertz. For a coil type generator the maximum frequency is typically 35–50 magahertz. After heating plastic material and flange 70 to the thermal joining temperature, coil 72 may be deenergized and pressure applied to lid 56 and bottom 68, as shown by the arrows in FIG. 1, to complete the joinder of lid 56 and container bottom 68. The time required for heat sealing will depend on susceptor type and loading, field frequency, etc., but is typically less than 1 second.

While stratified material 8 is shown as a two element structure in FIG. 2, additional layers may be incorporated in the material, as shown in FIG. 3. In that Figure a three element material 80 is shown having a 3 mil heat sealable layer 82 of high density polyethylene, a 5 mil heat generating and barrier polyvinylidene chloride layer 84 containing susceptor 6, and a 20 mil high density polyethylene layer 86 which provides structural strength to the material.

FIG. 4 shows a method of forming a plastic container, similar in form and shape to an ordinary tin can. A stratified material is produced by coextrusion, as shown in FIG. 1. The stratified material is formed, as by thermoforming material 90, into a circular container lid 92 having an annular flange 94. Plastic material 4 containing susceptor 6 is located on the outside flange 94. A bottom 96 for the container is also formed in a similar manner. As lid 92 and bottom 96 are punched from the coextruded stratified material, score or tear lines may be cut into plastic material 2 to facilitate the opening of the container. Or a pull tab 98 may be affixed to the lid. If desired, pull tab 98 may be bonded to lid 92 by heating the susceptor 6 in plastic material 4 to soften plastic material 2 and allow affixation of pull tab 98.

The body for the container may be formed from tubular stock which is cut to form body 99 having the desired length.

Bottom 96 is inserted in one end of tubular body 99, as shown in FIG. 4, so that plastic material 4 on flange 94 in contiguous with the inside of body 99. Induction heating coil 72 is placed adjacent the end of body 99 and energized. The resulting magnetic field heats susceptor material 6, flange 94, and container body 99 forming a thermal joint between bottom 96 and container body 99.

The container may then be filled and closed by lid 92. Lid 92 is bonded to body 99 by a process similar to that used to bond bottom 96 to body 99.

To open the container, lid 92 or bottom 96 is broken open by conventional can opening means or by the use of pull tab 98.

It will be appreciated that with both the container shown in FIG. 1 and the container shown in FIG. 4 no additional elements other than the lid and body are required, thereby facilitating the sealing of the containers.

While the method and article of FIGS. 1 and 3 show the use of a stratified structure in forming the closure element of a container, stratified structures may also be utilized in the body of the container. In FIG. 5, coextrusion machine 14a provides a tubular product rather than a sheet product, as shown in connection with coextrusion machine 14 of FIG. 1. Coextrusion machine 14a utilizes two extrusion passages 16a and 18a fed by loading apparatus 26 and 34, respectively. The extrusion passages and the extrusion dies are concentrically arranged so that a cylinder of plastic material 2 is formed having a layer of plastic material 4 and susceptor 6 intimately joined to the inside of the cylinder.

The coextruded tubular stock so formed is cut to length by shear 100 to form tubular container bodies 102. The lid and bottom 104 for container body 102 are punched from a plastic sheet and thermo-formed to include flange 106. Lid and bottom 104 are inserted in body 102 and joined by induction heating coil 72 in the manner described above. Susceptor 6 in container body 102 may additionally serve as a light barrier to protect the contents from deterioration by exposure to light.

While susceptor materials, such as iron oxide, are quite low in cost, thereby permitting their use throughout articles formed from the stratified structure, it may, in some cases, be desirable to provide the susceptor only at the locations at which heating is desired. FIG. 6 shows an example of this technique in which the susceptor material is provided only at the locations at which heat sealing is desired.

The tubular stock 108 for container bodies 110, similar to container bodies 102 shown in FIG. 5, is formed. However, instead of continuously coextruding the coaxial cylinders of plastic materials 2 and 4, plastic material 4 is only intermittently coextruded on the inside of the plastic material 2 cylinder. Specifically, a band of plastic material 4 is provided at either end of the tubular container bodies 110, as shown in greater detail in FIG. 7. To this end, the operation of shear 100 and the passage of plastic material 4 through extrusion passage 18a is coordinated to provide axially spaced annular areas 112 of plastic material 4 on the cylinder on the plastic material 2 and to cut the tubular stock 108 in the center of the annular areas 112 to form annular bands 114 at either end of container body 108.

A measuring device 116, including measuring wheel 118, rotatable by the extruded cylinder of plastic material 2 may be used to record the length of the tubular stock issuing from coextrusion machine 14a. Measuring device 116 is coupled to shear 100 to actuate the shear when a quantity of tubular stock commensurate with the desired size of container body 110 has passed. Measuring device 116 is also coupled to control 32a which regulates the movement of plastic material 4 in extrusion passage 18a by means of motor 24a.

In operation, measuring device 110 measures the length of the plastic material 2 cylinder issuing from coextrusion machine 14a. After a predetermined length of tubular stock 108 has passed measuring device 116, the device causes control 32a to move plastic material 4 down extrusion passage 18a to coextrude plastic material 4 and susceptor 6 on the interior of plastic material 2 for a preset length of the plastic material 2 cylinder, after which the coextrusion stops. This forms the annular area 112 of plastic material 4 on the inside of plastic material 2 cylinder. The extrusion of plastic material 2 alone continues.

As the passage of the tubular stock extends, measuring device 116 actuates shear 110 to sever tubular stock 108 in the middle of annular area 112. The above process is then repeated and the resulting product is shown in FIG. 6 comprising a cylinder having a band 114 of plastic material 4 and susceptor 6 coextruded at either end thereof. The ends of the cylinder 110 may be affixed to container ends in the manner described in connection with FIG. 6 to provide the completed container.

If it is desired to avoid the unevenness in the thickness of the stratified material shown in FIG. 7 caused by the spaced coextrusion of plastic materials 2 and 4, plastic material 4 may be continuously coextruded with plastic material 2 but susceptor 6 only intermediately incorporated in plastic material 4. A stratified material so formed is shown in FIG. 8 and may be provided by connecting measuring device 116 to valve 40 in loading apparatus 38 for susceptor 6 so that the susceptor is periodically incorporated in plastic material 4 in extrusion passage 18a.

In the alternative, the thickness of each of the coextruded layers may be controlled to maintain the thickness of the stratified material constant. Thus as the layer of plastic material 4 is periodically coextruded with plastic material 2, the thickness of the latter may be reduced, as shown in FIG. 9 to maintain the thickness of the stratified material constant. This technique can be obtained by coupling measuring device 116 to the control for each of the coextrusion passages 16a and 18a to coordinately reduce the thickness of the layer of plastic material 2 when plastic materials 2 and 4 are being coextruded.

The use of the stratified material shown in FIG. 9 in a container permits the lid to overlap the container body as shown in FIG. 10 since the coextruded plastic material 4 containing susceptor 6 may be placed inside the cap.

Various modes of carrying out the invention are contemplated as being within the scope of the following claims particularly pointing out and distinctly claiming the subject matter which is regarded as the invention.

I claim:
1. A method of making a closed container article having a plurality of parts joined along closure seams comprising the steps of:
  providing a first article part having a container article element region and a first thermally joinable region;
  providing a second article part by coextrusion through layer forming dies by,
    providing a plurality of fusible thermoplastic compositions at first locations removed from the layer forming dies,
    moving the compositions from the first location towards the dies, the movement of at least one of the compositions being accompanied by an agitation thereof,
    uniformly providing in one of the compositions during its movement toward the die and by means of its agitation, a particulate ferromagnetic oxide susceptor;
    heating the compositions to a malleable and fusible state during the movement, and
    forcing the compositions through respective dies into intimate contact with each other while in the malleable and fusible state to form a sheet having joined stratified layers of the compositions coextensive with its dimensions,
  forming the stratified sheet into a second container article part having a container article element region and a second thermally joinable region contiguous with the article element region, each of said regions containing the susceptor laden layer;
  juxtapositioning the first and second article parts so that the thermally joinable regions of said first and second article parts are contiguous along a closure seam;
  applying an alternating magnetic field to the thermally joinable region of said second article part to heat the regions; and
  bringing the contiguous regions of the first and second article parts into contact to effect thermal joinder between the two to seal the part into the container article.

2. The method according to claim 1 wherein the step of providing the particulate susceptor is further defined as providing a susceptor selected from a material class consisting of the oxides of iron having ferromagnetic properties.

3. The method according to claim 2 wherein the step of providing the particulate susceptor is further defined as providing a susceptor in a size range of submicron to 20 microns.

4. The method according to claim 2 wherein the step of applying the alternating magnetic field is further defined as applying an alternating magnetic field having a frequency of 0.45 to 5000 megahertz.

5. The method according to claim 2 including the step of incorporating a masking agent in a composition other than the one containing the particulate susceptor.

6. The method according to claim 1 further defined as forming one of said container article part as a receptacle having an opening with a thermally joinable region about the opening and forming the other article part as a receptacle closure for closing said opening with another thermally joinable region mateable with the first thermally joinable region.

7. The method according to claim 6 wherein the step of providing said first container article part is further defined as forming a tube having a pair of first thermally joinable regions adjacent either end of said tube and wherein the step of forming the said second article part is further defined as forming a pair of plugs for the ends of said tube having annular second thermally joinable regions mateable with said first thermally joinable regions.

8. The method according to claim 6 wherein the step of forming said second article part is further defined as forming a tubular receptacle having a pair of second thermally joinable regions adjacent either end of said tube and wherein the step of providing said first container article part is further defined as forming a pair of plugs for the ends of said tube having annular first thermally joinable regions mateable with said second thermally joinable regions.

9. The method according to claim 6 further defined as forming the first container article part as the receptacle and said second article part as the closure.

10. The method according to claim 9 wherein the step of providing said first container article part is further defined as forming a tubular receptacle having a flange-like first thermally joinable region about the open end thereof and wherein the step of forming said second container article part is further defined as forming a circular lid having a flange-like second thermally joinable region mateable with said first thermally joinable region.

11. The method according to claim 1 including the step of selecting fusible thermoplastic compositions having properties desired in the assembled container article.

12. The method according to claim 1 wherein the incorporation step is further defined as incorporating the particulate susceptor in quantities of up to 30% by weight with respect to the one composition.

* * * * *